United States Patent
Singh et al.

(10) Patent No.: US 8,774,131 B1
(45) Date of Patent: Jul. 8, 2014

(54) FACILITATING NETWORK TRANSFER BASED ON NETWORK CONDITIONS

(75) Inventors: Jasinder Pal Singh, Olathe, KS (US); Sachin R. Vargantwar, Overland Park, KS (US); Maulik Shah, Overland Park, KS (US); Deveshkumar N. Rai, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 64 days.

(21) Appl. No.: 13/344,235

(22) Filed: Jan. 5, 2012

(51) Int. Cl.
*H04W 4/00* (2009.01)

(52) U.S. Cl.
USPC .......................... 370/331; 370/236; 370/252

(58) Field of Classification Search
USPC ......... 370/229, 230, 236, 252, 328, 331, 332, 370/352
See application file for complete search history.

(56) References Cited

U.S. PATENT DOCUMENTS

| | | | |
|---|---|---|---|
| 2008/0014941 A1* | 1/2008 | Catovic et al. ................ | 455/436 |
| 2010/0150112 A1* | 6/2010 | Lee et al. ..................... | 370/332 |
| 2010/0317378 A1* | 12/2010 | Fang et al. ................... | 455/466 |
| 2011/0019639 A1* | 1/2011 | Karaoguz et al. ............. | 370/331 |
| 2011/0026484 A1* | 2/2011 | Fox et al. ...................... | 370/331 |
| 2011/0182271 A1* | 7/2011 | Pica et al. ..................... | 370/332 |
| 2012/0051321 A1* | 3/2012 | De et al. ....................... | 370/331 |
| 2012/0100852 A1* | 4/2012 | Horn ............................ | 455/436 |
| 2012/0164954 A1* | 6/2012 | Karampatsis et al. ..... | 455/67.11 |
| 2012/0170471 A1* | 7/2012 | Brown et al. ................ | 370/252 |
| 2012/0177002 A1* | 7/2012 | Faucher et al. ............... | 370/331 |
| 2012/0207127 A1* | 8/2012 | Xie ............................... | 370/331 |

* cited by examiner

*Primary Examiner* — Kwang B Yao
*Assistant Examiner* — Nguyen Ngo

(57) ABSTRACT

Systems, methods, and computer-readable media, for facilitating providing network transfer messages based on network conditions are provided. In embodiments, one or more network-condition data that indicate a network condition of a first wireless network being used by a mobile device are received. The network-condition data are utilized to determine a transmission time attribute that indicates a time or a frequency at which to transmit a set of network transfer messages that provide an indication for the mobile device to seek a second wireless network. The set of network transfer messages are transmitted in accordance with the determined transmission time attribute.

14 Claims, 4 Drawing Sheets

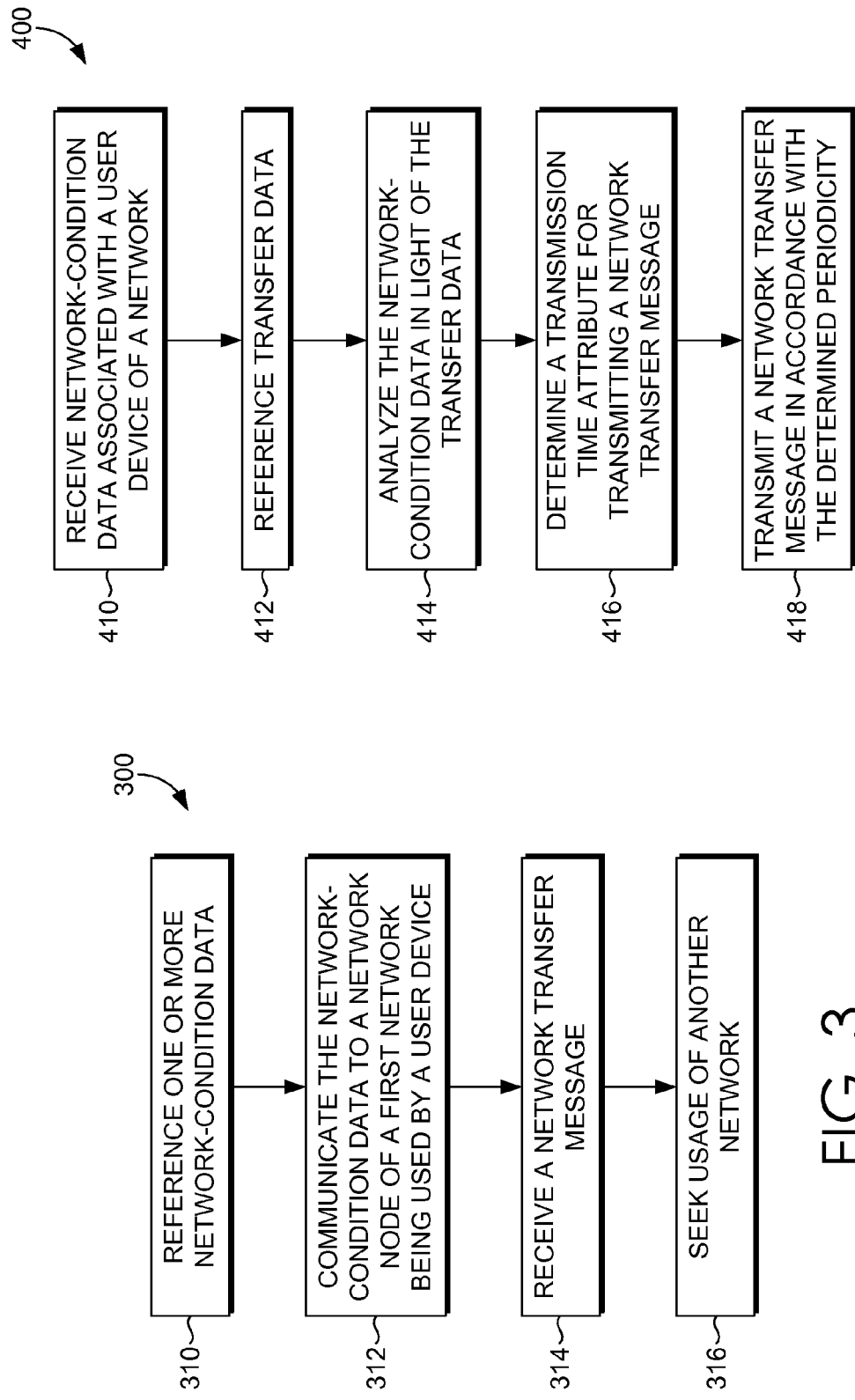

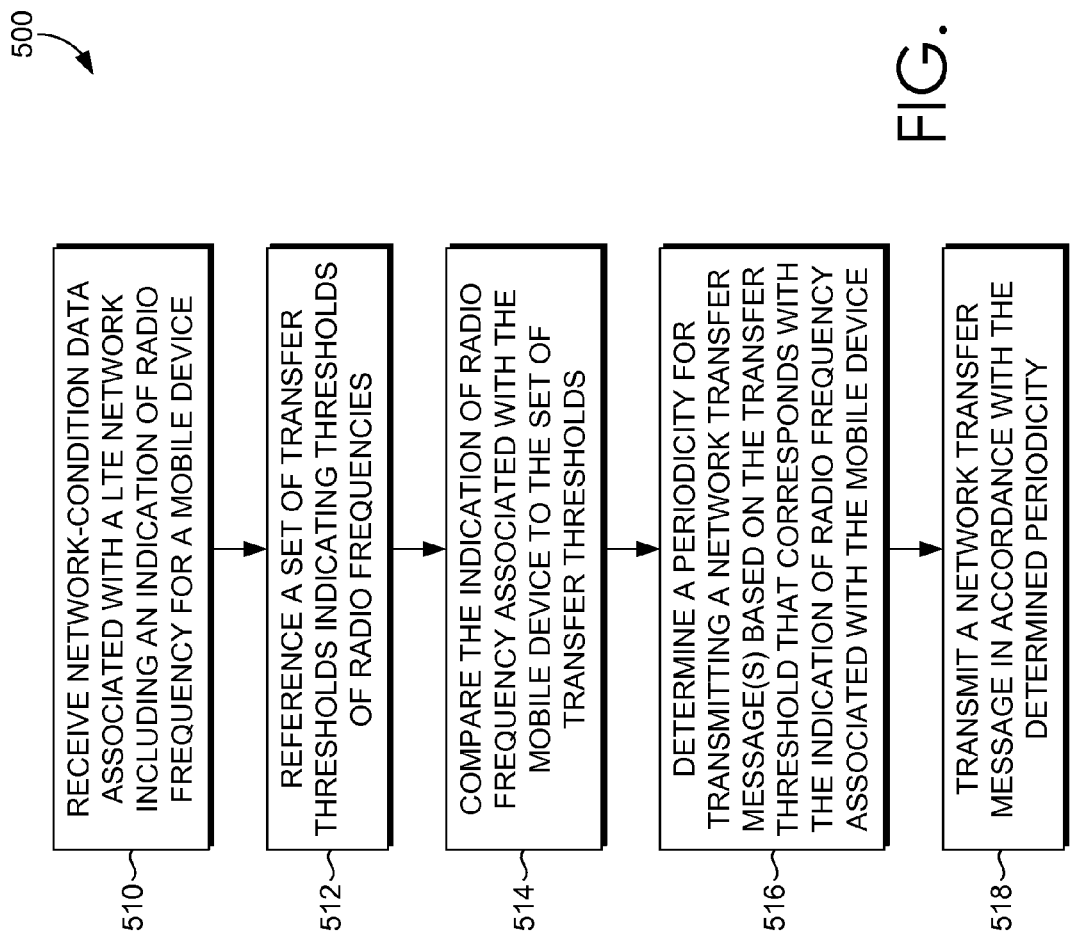

FACILITATING NETWORK TRANSFER BASED ON NETWORK CONDITIONS

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, facilitating network transfer based on network conditions. Utilizing embodiments hereof, periodicity of messages sent to a mobile device indicating to seek usage of a secondary network may be dynamically determined based on the network conditions associated with the mobile device. In this way, such messages are not transmitted in circumstances in which network transfer is unnecessary, thereby reducing traffic transmitted over the network.

BRIEF DESCRIPTION OF THE DRAWINGS

Illustrative embodiments of the present invention are described in detail below with reference to the attached drawing figures, and wherein:

FIG. 3 provides an exemplary first method for facilitating providing network transfer messages based on network conditions, in accordance with an embodiment of the present invention;

FIG. 4 provides an exemplary second method for facilitating providing network transfer messages based on network conditions, in accordance with an embodiment of the present invention; and FIG. 5 provides an exemplary third method for facilitating providing network transfer messages based on network conditions, in accordance with an embodiment of the present invention.

DETAILED DESCRIPTION

Figure 1:
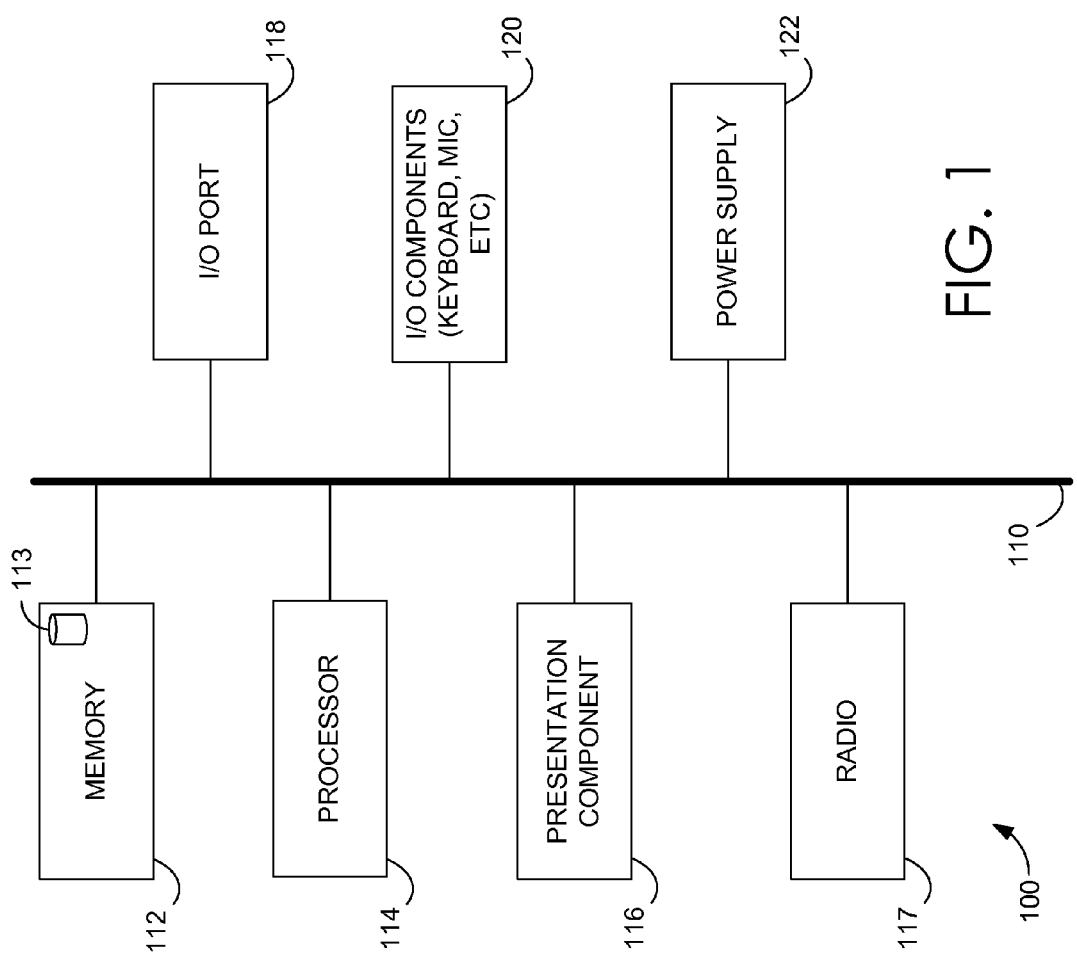
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for facilitating network transfer based on network conditions. Utilizing embodiments hereof, network transfer messages are communicated to a mobile device in accordance with network conditions associated with a network initially utilized by the mobile device. In this regard, network transfer messages can be transmitted over the network as needed rather than transmitted on a periodic basis. Accordingly, such an embodiment reduces control and management traffic being transmitted over the network and thereby increases capacity for data traffic or other control traffic.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Technology |
| 4G | Fourth-Generation Cellular Communication System |
| BSC | Base Station Controller |
| BTS | Base Transceiver Station |
| CD-ROM | Compact Disk Read Only Memory |
| CDMA | Code Division Multiple Access |
| eNB | eNode B |
| GIS | Geographic/Geographical/Geospatial Information System |
| GPRS | General Packet Radio Service |
| GSM | Global System for Mobile communications: originally from Groupe Spécial Mobile |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIB | Master Information Block |
| PC | Personal Computer |
| PCS | Personal Communications Service |
| PDA | Personal Digital Assistant |
| RAM | Random Access Memory |
| RNC | Radio Network Controller |
| ROM | Read Only Memory |
| SIB | System Information Block |
| TDMA | Time Division Multiple Access |
| UMTS | Universal Mobile Telecommunications Systems |

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention facilitate network transfer based on network conditions. Utilizing embodiments hereof, network transfer messages are communicated to a mobile device in accordance with network conditions associated with a network initially utilized by the mobile device. In this regard, network transfer messages can be transmitted over the network as needed rather than transmitted on a periodic basis. Accordingly, such an embodiment reduces control and management traffic being transmitted over the network and thereby increases capacity for data traffic or other control traffic.

According, in one aspect, the present invention is directed to one or more computer-readable media having computer-executable instructions embodied thereon that, when executed, perform a method for facilitating providing network transfer messages based on network conditions. The method includes communicating one or more network-condition data that indicate a condition of a first network being used by a mobile device. The method also includes in response to communicating the one or more network-condition data, receiving a transfer network message that provides an indication for the mobile device to seek a second network. The transfer network message can be received based on the condition of the first network being used by the mobile device.

In another aspect, embodiments of the present invention are directed to one or more computer-readable media having computer-executable instructions embodied thereon that, when executed, perform a method for facilitating providing network transfer messages based on network conditions. The method includes receiving one or more network-condition data that indicate a network condition of a first wireless network being used by a mobile device. The method also includes using the network-condition data to determine a transmission time attribute that indicates a time or a frequency at which to transmit a set of one or more network transfer messages that provide an indication for the mobile device to seek a second wireless network. The method further includes transmitting the set of network transfer messages in accordance with the determined transmission time attribute.

In yet another aspect, a method for facilitating providing network transfer messages based on network conditions. The method includes receiving an indication of a radio frequency associated with a mobile device in a first network. A transfer threshold indicating a radio frequency is referenced. The indication of the radio frequency is compared to the transfer threshold. A periodicity for transmitting a network transfer message is determined based on the indication of the radio frequency associated with the mobile device exceeding a threshold. The network transfer message is transmitted in accordance with the determined periodicity.

Figure 2:
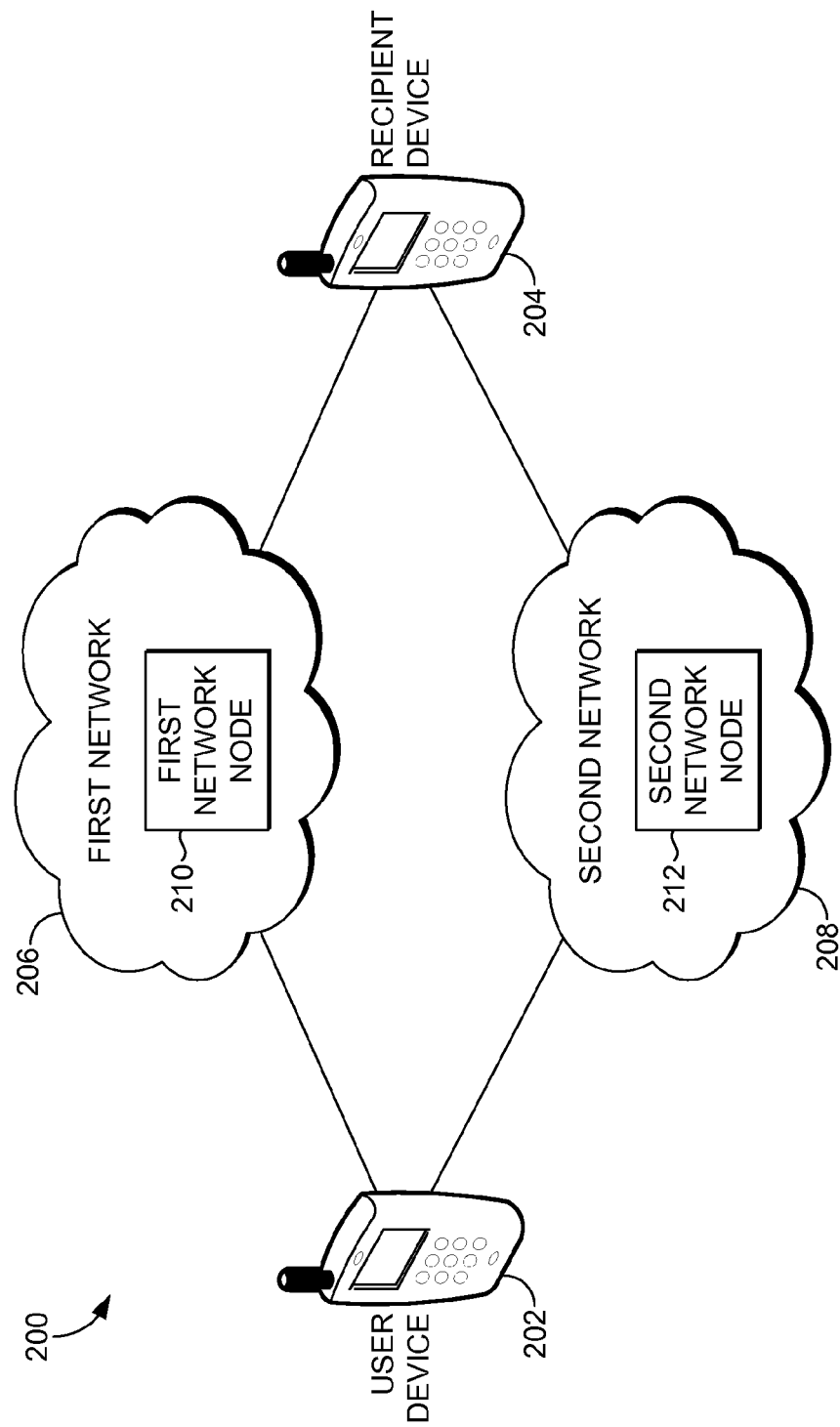
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 202 may communicate with a recipient device 204. The user device 202 and/or the recipient device 204 may take on a variety of forms, such as a personal computer (PC), a laptop computer, a tablet, a mobile phone, a personal digital assistant (PDA), a server, or any other device that is cable of communicating with other devices. For example, the user device 202 and/or the recipient device 204 can take on any form, such as, for example, a server that hosts information accessed by the user device 202 (e.g., a website host) via the Internet, a mobile device, a landline device, or any other computing device capable of communication with the other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device and/or a recipient device comprise a wireless or mobile device with which a wireless telecommunications network is utilized for communication (e.g., voice and/or data communication). In this regard, the user device communicates with other devices using a wireless telecommunications network(s).

The user device 202 and the recipient device 204 are capable of communicating via a communications network, such as a first network 206 and/or a second network 208. Networks 206 and/or 208 might be a single network or multiple networks, as well as being a network of networks. A network(s) might comprises, for example, a cable network, the Internet, a wireless network (e.g., a wireless telecommunications network), or a combination thereof or portions thereof.

In embodiments, the network 206 and/or the network 208 is or includes a wireless network (e.g., a wireless telecommunications network). A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Long Term Evolution (LTE), Universal Mobile Telecommunications Systems (UMTS), Integrated Digital Enhanced Network (iDEN), WiMAX, 3G, 4G, and Personal Communications Service (PCS). A wireless telecommunications network might include an array of devices. Components such as a base station, a communications tower, or even access points (as well as other components) can provide wireless connectivity in some embodiments. In one embodiment, the first network 106 is a LTE network, and the second network is a CDMA network. Accordingly, the user device 202 can communicate using both CDMA and LTE.

The user device 202 may utilize the first network 206 and/or the second network 208 to communicate by way of a first network node 210 and a second network node 212, respectively. A network node refers to a station that is connected to a mobile phone network that communicates directly with mobile devices. A network node might be, for example, a base transceiver station (BTS) or a Node B (or eNode B). In an embodiment that the first network 206 comprises a LTE network and the second network 208 comprises a CDMA network, the first network node 210 can comprise a Node B and the second network node 212 can comprise a BTS.

The first network node 210 and the second network node 212 transmit and receive radio signals. In embodiments, a network node includes a transceiver(s), an antenna(s), and equipment for encrypting and decrypting communications, for example, with a base station controller (BSC) or radio network controller (RNC) (not shown). A network node can include any number of antennas (not shown). In one embodiment, a network node includes an antenna(s) capable of supporting multiple networks.

In implementation, the user device 202 is initially authorized or registered to utilize the first network 206 for communication, such as data and/or voice communications. In one embodiment, the first network 206 comprises a LTE network. Accordingly, the user device 202 is connected to a LTE network. The user device 202 utilizes the first network 206 (e.g., LTE) via the first network node 210.

Upon initiating a connection between the user device 202 and the first network node 210, such as a Node B, data can be transmitted therebetween. Generally, various types of information can be communicated between the first network node 210 and the user device 202. The first network node 210 can communicate any number of messages that can be used such that the user device 202 can operate via a network.

In the instance that the user device 202 is initially connected to a first network 206 comprising a LTE network, various master information blocks (MIB) and system information blocks (SIB) can be communicated from the first network node 210 to the user device 202. In such a case, initially, a MIB is received or recognized by the user device 202, for example, after the user device 202 attains download synchronization. An MIB can include information that is used for a mobile device to acquire other information. For example, an MIB may include a channel bandwidth, a physical hybrid indicator channel, a system frame number which facilitates synchronization and can be used as a timing reference, an eNB (eNode B) transmit antenna configuration specifying the number of transmit antennas at eNB, etc.

Further, various SIB messages can also be received or recognized by the user device 202, such as SIB 1-SIB 11. Information contained in SIB messages can facilitate communication between a user device and a network. By way of example only, SIB 1 can include information related to mobile device cell access (e.g., access restrictions, tracking area code, cell ID, cell barring status. SIB 1 can also include information that defines or indicates schedules or periodicity of other SIB messages (e.g., transmission times and periodicities of other SIBs). In this regard, the SIB 1 message contains time periods at which other SIB messages (e.g., SIB 2-SIB 11) are transmitted. SIB 2 can contain radio resource configuration information, for example, common for all mobile devices (e.g., uplink carrier frequency, uplink channel bandwidth, random access channel configuration, paging configuration, uplink power control configuration, sounding reference signal configuration, physical uplink shared channel, etc.). SIB 3 can include information common for intra-frequency, inter-frequency, and/or inter-RAT cell reselection (e.g., threshold for starting intra-frequency measurement, minimum required Rx level in the cell, cell reselection priority, etc.). SIB 4 can include intra-frequency neighboring cell information for Intra-LTE intra-frequency cell reselection (e.g., neighbor cell list, black cell list, etc.). SIB 5 can include neighbor cell related information for Intra-LTE inter-frequency cell-reselection (e.g., neighbor cell list, carrier frequency, cell reselection priority, threshold used by the mobile device, etc.). SIB 6 can include cell reselection information for UTRA. SIB 7 can include cell reselection information for GERAN. SIB 8 can include cell reselection info for CDMA2000, as described more fully below. SIB 9 can include home eNB identifier. SIB 10 can include ETWS primary notification information. SIB 11 can include ETWS secondary notification information. Examples of content within MIB and SIB messages are intended to be merely exemplary and are not intended to limit the scope of this invention.

According, to embodiments of the present invention, network transfer messages can be communicated from the first network node 210 to the user device 202. A network transfer message, as used herein, refers to a message that contains information related to transfer of a mobile device to another network. In this regard, a network transfer message can facilitate transferring a mobile device from one network to another network. By way of example, a network transfer message may enable transferring a mobile device from a LTE network to a CDMA network. In one implementation, a network transfer message might be a SIB 8 message.

In embodiments, a network transfer message includes a request to seek another network. Such a request to seek another network can provide the specific network for which to seek. For example, a network transfer message may indicate a request to seek the second network 208 (e.g., the CDMA network). Additionally or alternatively, a network transfer message may include CDMA information to be used to hand-off the user device 202 to another network, such as the CDMA network.

Rather than the first network node 210 communicating a network transfer message to mobile devices on a periodic basis, such as every five seconds, in embodiments of the present invention, the network transfer message can be transmitted in accordance with various network conditions. For example, instead of SIB 8 messages being communicated from the first network node 210 in accordance with the periodicity provided in a SIB 1 message, SIB 8 messages can be transmitted in accordance with network conditions. This facilitates avoiding transmitting messages when such a transmission is not required. For instance, if the user device 202 has acceptable radio frequency conditions utilizing the first network, a network transfer message to seek the second network 208 is unnecessary or undesirable.

As such, the first network node 210, such as a node B, can identify network-condition data associated with the user device 202. Thereafter, such network-condition data can be used to determine a timing or periodicity for transmitting a network transfer message(s). Network-condition data refers to any data that indicates or describes a network condition associated with a mobile device. For example, network-condition data may indicate radio frequency (RF) condition, a border sector, a signal to noise ratio (SINR), etc.

As can be appreciated, in embodiments, such network-condition data is provided by the user device 202. In this regard, the user device 202 sends messages providing an indication of network conditions associated therewith. For instance, the user device 202 can provide an indication of radio frequency quality, a signal to noise ratio (SINR), etc.

To determine timing or periodicity for transmitting network transfer messages, transfer data can be used in association with network-condition data. Generally, transfer data provides rules, guidelines, thresholds, or parameters that indicate message transmission timing or periodicity. Transfer data refers to any data that can indicate if, when, and/or how often to transmit a transfer data message(s). For example, in one embodiment, transfer data might be thresholds that correspond with network-condition data, such as radio frequency conditions. Transfer data might be stored, for example, in association with the first network node such that the transfer data can be referenced and utilized to determine transmission time, frequency, or periodicity of transfer data messages. Such transfer data can be set or established, for example, by the wireless provider of the first network 206.

For the sake of clarity, transmission time, frequency, and/or periodicity may be referred to herein as a transmission time attribute or time attribute. In this regard, a transmission time attribute can indicate if, when, and/or how often transfer data messages may be sent.

In embodiments, the network-condition data is compared to the transfer data to determine or identify if, when, and/or how often to transmit a transfer data message(s). That is, the network-condition data is compared to transfer data to identify an appropriate transmission time attribute in accordance with the network conditions for a user device. In this regard, it might be determined to immediately transmit a transfer data message, to increase or decrease a given periodicity for transmitting transfer data messages, to transmit a transfer data message at a specific periodicity, and/or the like. Generally, the more the network-condition data indicates an appropriate or preferred network condition, such as radio frequency, the less the frequency for sending transfer data messages (e.g., no message sent or increased duration between sent messages). By contrast, the less the network-condition data indicates an appropriate or preferred network condition (e.g., decreased radio frequency), the greater the frequency for sending transfer data messages (e.g., messages sent at a smaller interval). In this regard, a mobile device in a poor, inadequate, or non-preferred network condition is more likely to receive transfer data messages more frequently than when in a proper, adequate or preferred network condition.

By way of example only, assume that the transfer data indicates that when a mobile device is registered or handed down to a border sector associated with the first network 206 (e.g., a LTE border sector having minimal or no network coverage), a network transfer message should be transmitted to the mobile device. In such a case, upon a mobile device entering a border sector and providing an indication thereof to the first network node 210, it can be determined that a network transfer message should be sent to the mobile device such that the second network can be utilized.

As another example, assume that the transfer data indicates that when a mobile device is in acceptable coverage by a network, a network transfer message should not be transmitted to the mobile device. In this regard, various thresholds might be utilized to indicate when network-condition data is deemed acceptable. For instance, if the radio frequency condition is greater than a first threshold, then a network transfer message is to be sent every fifteen seconds; if the radio frequency condition is greater than a second threshold, then do not send a network transfer message; if the radio frequency condition is lower than a third threshold, increase the frequency of which to send network transfer messages.

With reference to FIG. 3, a flow diagram is shown illustrating a method 300 for facilitating providing network transfer messages based on network conditions, in accordance with an embodiment of the present invention. In embodiments, method 300 can be performed at a user device, such as user device 202 of FIG. 2. Initially, as indicated at block 310, one or more network-condition data is referenced. Such network-condition data can be obtained, determined, or received at the user device 202. Subsequently, at block 312, the network-condition data is communicated to a first network node of a first network being used by the user device. In this regard, the network-condition data is communicated to the network being utilized by the user device, such as a LTE network.

At block 314, a network transfer message is received. Such a network transfer message can provide an indication to seek usage of another network, such as a CDMA network. In one embodiment, the network transfer message is in the form of a SIB 8 message. According to embodiments of the present invention, the network transfer message can be received in poor or reduced network coverage. At block 316, in response to the network transfer message, usage of another network is sought. In this regard, a mobile device can search for another network, such as a CDMA network, to which to connect.

Referring now to FIG. 4, a flow diagram is shown illustrating a method 400 for facilitating providing network transfer messages based on network conditions, in accordance with an embodiment of the present invention. In embodiments, method 400 can be performed at a network node, such as a first network node 210 of FIG. 2 (e.g., a node B). Initially, as indicated at block 410, network-condition data associated with a user device of a network is received. Such network-condition data can be data, for example, indicating RF condition, SINR, coverage, border sector, etc., that is provided by a mobile device associated with the network.

At block 412, transfer data is referenced. Such transfer data can provide an indication(s) of if, when, and/or how often to transmit a network transfer message (e.g., via rules, thresholds, parameters, etc.). At block 414, the network-condition data is analyzed in light of the transfer data. In this regard, the network-condition data might be compared to transfer data indicating thresholds, parameters, or rules associated with network conditions, such as radio frequency. At block 416, at least one transmission time attribute for transmitting a network transfer message(s) is determined. Such a time attribute can be determined based on the analysis of the network-condition data in connection with the referenced transfer data. For example, the transmission time attribute can indicate to forego or void sending a network transfer message, increase or decrease periodicity of sending network transfer messages, a specific periodicity at which to send network transfer messages, a time(s) at which to send a network transfer message (s), etc. Subsequently, at block 418, a network transfer message(s) is transmitted in accordance with the determined transmission time attribute.

Referring now to FIG. 5, a flow diagram is shown illustrating a method 500 for facilitating providing network transfer messages based on network conditions, in accordance with an embodiment of the present invention. In embodiments, method 500 can be performed at a network node, such as a first network node 210 of FIG. 2 (e.g., a node B). Initially, as indicated at block 510, network-condition data, including an indication of radio frequency for a mobile device, associated with a LTE network is received. Such network-condition data can be data, for example, indicating RF condition, SINR, coverage, border sector, etc., that is provided by a mobile device associated with the network.

At block 512, set of one or more transfer thresholds indicating thresholds of radio frequencies is referenced. Such transfer thresholds can provide an indication(s) of if, when, and/or how often to transmit a network transfer message. At block 514, the indication of radio frequency associated with the mobile device is compared to the set of transfer thresholds. At block 516, a periodicity for transmitting a network transfer message(s) is determined based on the particular transfer threshold that corresponds with the indication of radio frequency associated with the mobile device. Such a periodicity can indicate, for example, that no message should be transferred, a specific periodic transfer (e.g., 15 seconds, 10 seconds, etc.), an increase or decrease in frequency of transfer, etc. Subsequently, at block 518, a network transfer message(s) is transmitted in accordance with the determined periodicity. Such a network transfer message provides an indication to seek usage of a CDMA network. Thereafter, the mobile device may seek usage of another network, such as a CDMA network.

It will be understood by those of ordinary skill in the art that the order of steps shown in the method 300 of FIG. 3, method 400 of FIG. 4, and method 500 of FIG. 5 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed, perform a method for facilitating providing network transfer messages based on network conditions, the method comprising:
communicating one or more network-condition data indicating that the mobile device has transferred to a network node providing minimal network coverage to the mobile device, wherein the network node is associated with a first network being used by a mobile device; and
in response to communicating the one or more network-condition data, receiving a network transfer message that provides an indication for the mobile device to seek a second network, the network transfer message being transmitted to the mobile device based on reception of the one or more network-condition data indicating that the mobile device transferred to the network node associated with the first network providing minimal network coverage to the mobile device.

2. The media of claim 1, wherein the first network comprises a LTE network, and the second network comprises a CDMA network.

3. One or more non-transitory computer-readable media having computer-executable instructions embodied thereon that, when executed, perform a method for facilitating providing network transfer messages based on network conditions, the method comprising:
receiving one or more network-condition data that indicate a network condition of a first wireless network being used by a mobile device;
using the network-condition data to determine a transmission time attribute that indicates a frequency at which to transmit a set of one or more network transfer messages that provide an indication for the mobile device to seek a second wireless network, wherein
a first frequency at which to transmit the set of one or more network transfer messages to the mobile device is determined when the network-condition data indicates minimal network coverage provided by the first wireless network, and
a second frequency at which to transmit the set of one or more network transfer messages to the mobile device is determined when the network-condition data indicates satisfactory network coverage provided by the first wireless network, the first frequency being greater than the second frequency; and
transmitting the set of one or more network transfer messages in accordance with the determined transmission time attribute.

4. The media of claim 3, wherein the one or more network-condition data indicate a radio frequency signal associated with the mobile device.

5. The media of claim 3, wherein the one or more network-condition data comprises at least a signal to noise ratio associated with the mobile device.

6. The media of claim 3, wherein the first mobile network comprises a LTE network, and the second mobile network comprises a CDMA network.

7. The media of claim 3, wherein the network-condition data is compared to a set of transfer data that indicates a frequency at which the set of network transfer messages are to be sent.

8. The media of claim 3, wherein the transmission time attribute is a greater frequency when the network condition associated with the mobile device exceeds a threshold.

9. A method for facilitating providing network transfer messages based on network conditions, the method comprising:
at a first instance, receiving an indication of a first radio frequency associated with a mobile device in a first network;

referencing at least one transfer threshold indicating a radio frequency;

comparing the indication of the first radio frequency to the at least one transfer threshold;

determining a first periodicity for transmitting a first set of one or more network transfer messages based on the indication of the first radio frequency associated with the mobile device exceeding a first threshold;

transmitting the first set of network transfer messages to the mobile device in accordance with the determined first periodicity;

at a second instance, receiving an indication of a second radio frequency associated with the mobile device in the first network;

referencing the at least one transfer threshold;

comparing the indication of the second radio frequency to the at least one transfer threshold;

determining a second periodicity for transmitting a second set of one or more network transfer messages based on the indication of the second radio frequency associated with the mobile device exceeding a second threshold; and transmitting the second set of network transfer messages to the mobile device in accordance with the determined second periodicity, wherein the first periodicity and the second periodicity comprise different intervals of time that, upon expiration of the time, a network transfer message is sent.

10. The method of claim 9, wherein the indication of the radio frequency comprises a signal to noise ratio.

11. The method of claim 9, wherein the first periodicity for transmitting the one or more network transfer messages comprises not transferring the one or more network messages.

12. The method of claim 9, wherein the first set of one or more network transfer messages provide an indication to the mobile device to seek services of a second network.

13. The method of claim 12, wherein the first set of one or more network messages comprise a SIB 8 message.

14. The method of claim 13, wherein the first network comprises a LTE network and the second network comprises a CDMA network.

* * * * *